(12) United States Patent
Hamalainen

(10) Patent No.: US 12,332,654 B2
(45) Date of Patent: Jun. 17, 2025

(54) UNDERGROUND WORKSITE VEHICLE POSITIONING CONTROL

(71) Applicant: SANDVIK MINING AND CONSTRUCTION OY, Tampere (FI)

(72) Inventor: Jyrki Hamalainen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 190 days.

(21) Appl. No.: 18/023,787

(22) PCT Filed: Sep. 1, 2021

(86) PCT No.: PCT/EP2021/074171
§ 371 (c)(1),
(2) Date: Feb. 28, 2023

(87) PCT Pub. No.: WO2022/049151
PCT Pub. Date: Mar. 10, 2022

(65) Prior Publication Data
US 2023/0315119 A1 Oct. 5, 2023

(30) Foreign Application Priority Data
Sep. 1, 2020 (EP) ................................. 20193811

(51) Int. Cl.
*G05D 1/00* (2024.01)
(52) U.S. Cl.
CPC ........... *G05D 1/027* (2013.01); *G05D 1/0278* (2013.01)
(58) Field of Classification Search
CPC ............................ G05D 1/027; G05D 1/0278
See application file for complete search history.

(56) References Cited

U.S. PATENT DOCUMENTS

| | | | |
|---|---|---|---|
| 2010/0183422 A1* | 7/2010 | Makela | G01C 21/12 414/800 |
| 2015/0233718 A1* | 8/2015 | Grokop | G06Q 40/08 701/501 |
| 2016/0185346 A1 | 6/2016 | Awamori et al. | |
| 2016/0349753 A1 | 12/2016 | Tojima et al. | |
| 2018/0011200 A1* | 1/2018 | Ramamurthy | G01S 19/20 |
| 2018/0292543 A1* | 10/2018 | McFarland | G01C 21/165 |
| 2019/0072403 A1* | 3/2019 | Sakai | G01S 13/865 |
| 2019/0265368 A1* | 8/2019 | Shimizu | G01S 19/485 |
| 2020/0156640 A1* | 5/2020 | Jonasson | B60W 30/143 |
| 2020/0310436 A1* | 10/2020 | Panigrahi | G01S 1/042 |

FOREIGN PATENT DOCUMENTS

| | | |
|---|---|---|
| EP | 3660454 A1 | 6/2020 |
| WO | 2014176062 A1 | 10/2014 |
| WO | 2015106799 A1 | 7/2015 |

* cited by examiner

*Primary Examiner* — Naeem Taslim Alam
(74) *Attorney, Agent, or Firm* — Corinne R. Gorski

(57) ABSTRACT

A method for controlling autonomous vehicle operations includes the steps of defining an accumulated dead-reckoning based positioning error of a vehicle at a worksite including an underground tunnel system, detecting a trigger for signal acquisition for a satellite based first positioning source, in response to the detected trigger for signal acquisition, generating a satellite positioning pendency estimate indicative of a remaining time period for obtaining satellite-based positioning information by the first positioning source, and defining speed for the vehicle on the basis of the accumulated dead-reckoning based positioning error and the satellite positioning pendency estimate.

15 Claims, 5 Drawing Sheets

UNDERGROUND WORKSITE VEHICLE POSITIONING CONTROL

RELATED APPLICATION DATA

This application is a § 371 National Stage Application of PCT International Application No. PCT/EP2021/074171 filed Sep. 1, 2021 claiming priority to EP 20193811.5 filed Sep. 1, 2020.

FIELD

The present invention relates to positioning of vehicles, and in particular to vehicles operating at worksites comprising an underground tunnel portion and a surface portion.

BACKGROUND

Mining or construction excavation worksites, such as hard rock or soft rock mines, may comprise areas for automated operation of mobile vehicles, herein referred to as vehicles. A vehicle may be an unmanned, e.g. remotely controlled from a control room, or a manned vehicle, i.e. operated by an operator in a cabin of the mobile vehicle. Vehicles may be autonomously operating, i.e. automated or semi-automated vehicles, which in their normal operating mode operate independently without external control but which may be taken under external control at certain operation areas or conditions, such as during states of emergencies.

Vehicles may comprise one or more sensors for scanning environment of the vehicle, to detect obstacles and/or tunnel wall surface, for example. Such sensors, such as two-dimensional laser scanners, may be referred to as environment scanning sensors. Position tracking may be arranged particularly in underground mines on the basis of scanning data from the sensor(s) and a predefined environmental model. WO2015106799 discloses a system for scanning surroundings of a vehicle for producing data to determining position and orientation of the vehicle. The vehicle is provided with a reference point cloud data of the mine. The control unit is configured to match second point cloud data produced by a scanning device of the vehicle to the reference point cloud data in order to determine position data of the vehicle.

US2016185346 discloses stopping of dumping truck based on dead-reckoning travel distance. The truck is positioned by GPS, dead-reckoned position is corrected by the GPS position, and upper speed limit is changed in response to GPS accuracy degrading.

SUMMARY

According to a first aspect of the present invention, there is provided an apparatus, being configured to or comprising means configured for performing at least: defining accumulated dead-reckoning based positioning error of a vehicle at a worksite comprising an underground tunnel system, detecting a trigger for signal acquisition for satellite based first positioning source, in response to the detected trigger for signal acquisition, generating a satellite positioning pendency estimate indicative of remaining time period for obtaining satellite-based positioning information by the first positioning source, defining speed for the vehicle on the basis of the accumulated dead-reckoning based positioning error and the satellite positioning pendency estimate. The apparatus may be the vehicle or be a controller in/for the vehicle, such as loading and/or hauling vehicle or a drilling rig.

According to a second aspect of the present invention, there is provided a method for controlling autonomous operation of a vehicle, comprising: defining accumulated dead-reckoning based positioning error of a vehicle at a worksite comprising an underground tunnel system, detecting a trigger for signal acquisition for satellite based first positioning source, in response to the detected trigger for signal acquisition, generating a satellite positioning pendency estimate indicative of remaining time period for obtaining satellite-based positioning information by the first positioning source, defining speed for the vehicle on the basis of the accumulated dead-reckoning based positioning error and the satellite positioning pendency estimate.

According to a third aspect, there is provided an apparatus comprising at least one processor, at least one memory including computer program code, the at least one memory and the computer program code being configured to, with the at least one processor, provide the means for the apparatus and/or cause the apparatus at least to perform the method or an embodiment of the method.

According to a fourth aspect, there is provided a computer program, a computer program product or (a non-tangible) computer-readable medium comprising computer program code for, when executed in a data processing apparatus, to cause the apparatus to perform the method or an embodiment thereof.

EMBODIMENTS

Figure 1:
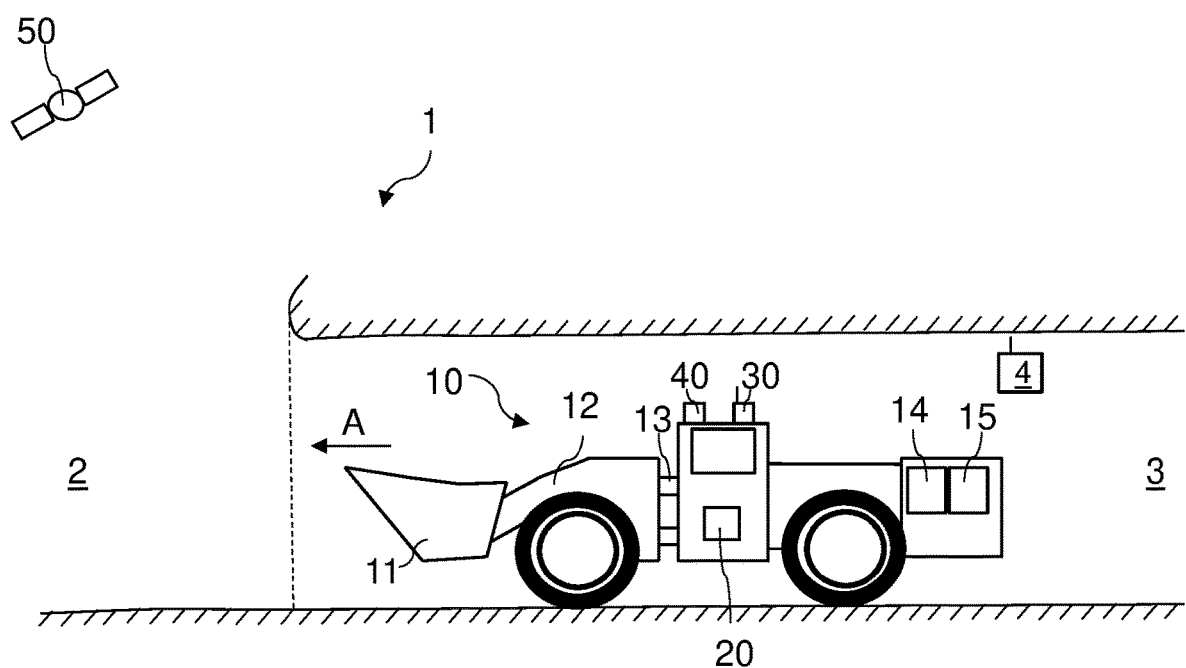
FIG. 1 illustrates an example of a vehicle at a worksite comprising an underground tunnel system.

FIG. 1 illustrates a simplified example of a worksite 1, in the present example comprising a surface portion 2 and an underground (tunnel) portion 3. The worksite may comprise an ore mine or a construction site, such as a railway or road tunnel site.

A vehicle 10 may operate at the worksite 1 and drive between the surface portion 2 and the underground portion 3. The vehicle is in the present example a loader or a load and haul (LHD) vehicle comprising a bucket 11 connected to a boom 12. The vehicle 10 may be an articulated vehicle comprising two sections connected by a joint 13. However, it will be appreciated that application of the presently disclosed features are not limited to any particular type of vehicle which may be used at excavation worksites. Some other examples of such vehicle include lorries, dumpers, vans, mobile rock drilling or milling rigs, or mobile reinforcement machines.

The vehicle 10 typically comprises a system 14 of pumps for generating hydraulic pressure for operating various parts of the machine, such as lifting the boom 12, turning the bucket 11, etc. The vehicle 10 may comprise one or more other sources of energy, such as an accumulator, a hydrogen container, a fuel tank, etc. The vehicle 10 comprises a motor 15, such as a combustion engine or an electric motor. Power from the motor 15 may be provided by a crank shaft to front and/or rear wheels either directly or via a gear box.

The vehicle 10 comprises at least one control unit 20 configured to control at least some functions and/or actuators of the vehicle. The control unit 20 may comprise one or more computing units/processors executing computer program code stored in memory. The control unit may be connected to one or more other control units of a control system of the vehicle, in some embodiments by a controller area network (CAN) bus. The control unit may comprise or be connected to a user interface with a display device as well as operator input interface for receiving operator commands and information to the control unit.

The control unit 20 may be configured to control at least positioning control related operations, but may be configured to perform also other control operations, such as autonomous operation control. There may be one or more other control units in the vehicle for controlling other operations. It is to be appreciated that the control unit 20 may be configured to perform at least some of the below illustrated features, or a plurality of control units or controllers may be applied to perform these features. There may be further operations modules or functions performed by the control unit(s), e.g. a positioning unit/module/function, a driveline control function, and/or a navigation function. It is to be appreciated that at least some of the control functionality could be implemented even outside the vehicle, e.g. at the worksite control system.

The vehicle 10 may comprise a wireless communication device, by which the control unit 20 and/or another unit of control system of the vehicle 10 may establish a data transmission connection to another (second) control system external to the vehicle by utilising a wireless connection provided by a base station or access node 4. The communication device may thus be connected to a communications system of the worksite, such as a wireless access system comprising a wireless local area network (WLAN) and/or a cellular communications network (e.g. a 4G, 5G or another generation cellular network). Non-terrestrial communication by a non-terrestrial transceiver may be configured via a satellite, e.g. by a Third Generation Partnership Project (3GPP) 5G based non-terrestrial network (NTN).

The external control system may comprise or be connected to further network(s) and/or data processing system(s), such as a worksite management system, a cloud service, a data analytics device/system, an intermediate communications network, such as the internet, etc. The system may comprise or be connected to further device(s) or control unit(s), such as a handheld user unit, a vehicle unit, a worksite management device/system, a remote control and/or monitoring device/system, data analytics device/system, sensor system/device, etc.

The vehicle 10 may be unmanned. Thus, the user interface may be remote from the vehicle and the vehicle may be remotely controlled by an operator in the tunnel, or in control room at the mine area, or even long distance away from the mine via communications network(s). A control unit outside the vehicle 10, for example in the worksite management system may be configured to perform some of the below illustrated features. The vehicle 10 may be an automated vehicle, which in an autonomous operating or driving mode may operate/drive independently without requiring continuous user control but which may be taken under external control during states of emergencies, for example. When the vehicle is in a manual driving mode, an operator drives the vehicle manually, by remote control or locally at the vehicle by operator controls. The operator may set the vehicle into a (default) automatic driving mode in which the vehicle drives automatically a specified route, e.g. between a loading point and a dump shaft. Below disclosed positioning related features may be performed when the vehicle 10 operates in the automatic driving mode.

The vehicle 10 comprises a positioning device or unit 30 for satellite-based positioning, which may also be referred to as satellite positioning unit, or as in the present example embodiments below, as Global Navigation Satellite System (GNSS) device. GNSS generally refers to satellite positioning systems that are operating or planned, such as GPS, GLONASS (Russia), Galileo (European Union), BeiDou (China), the Indian Regional Navigation Satellite System (IRNSS), QZSS (Japan). When the vehicle 10 is positioned in the surface portion 2, the GNSS device may have a line of sight to a satellite 50, receive GNSS signal and define position for the vehicle based on the GNSS signal. The GNSS device and the wireless communication device may be implemented in a single device.

In an embodiment, the positioning unit 30 includes a GPS receiver and an antenna for the GPS. When the position of the antenna is detected, the position of the vehicle 10 is detected. The antenna receives a radio wave from a GPS satellite. The antenna outputs an electric signal based on the received radio wave to the GPS receiver which calculates the position of the antenna based on the signal. It is to be noted that configuration of multiple antennas may be used, which may enable to calculate more accurate position information and also orientation information of the vehicle.

The vehicle 10 comprises one or more scanning units, or scanners 40, configured to perform scanning of environment around the vehicle. For example, the vehicle 10 may comprise a front scanner configured to scan environment towards normal forward driving direction A (and naturally to sides within reach of the scanner). The vehicle may also comprise a rear scanner configured to scan the environment towards direction opposite to A, i.e. backwards of the vehicle.

In some embodiments, the scanning results are applied to detect position and orientation of the vehicle and one or more further elements thereof, such as the scanner 40 or the bucket 11. The control unit 20, or alternatively another control/computation unit in the vehicle, may compare operational scanned tunnel profile data to reference profile data stored in an environment model and position the vehicle on the basis of finding a match in the environment model to position the vehicle and thus operate as scanning position source. The environment model may be obtained based on scanning by (teach-)driving the vehicle or other type of survey, for example.

In an embodiment, the scanner 40 may be a 2D scanner configured to monitor tunnel walls at desired height, for example. In another embodiment, the scanner 40 is a 3D scanner, in which case 3D scanning data or point cloud data is produced and applied for positioning the vehicle. Point cloud data generated on the basis of scanning may be applied for generating and updating an environment model, such as an underground tunnel model, which may be applied for positioning the vehicle at the worksite. The vehicle 10 may comprise a simultaneous localization and mapping (SLAM) unit configured to both position the vehicle and (augment) map the environment on the basis of (2D or 3D) scanning information while the vehicle is driving.

A control unit, e.g. the control unit 20, may execute a point cloud matching functionality for matching operational (scanned) point cloud data (being scanned by the scanner(s) 40) to environment model point cloud data, i.e. reference point cloud data. Position and direction of the scanning device and/or another interest point of the vehicle, such as the (leading edge of the) bucket 11, may be determined in worksite coordinate system on the basis of the detected matches between the operational point cloud data and the reference cloud data. The (2D or 3D) scanner may be a laser scanner, but it is to be appreciated that other scanner configurations and sensor types, appropriate for vehicles at underground worksite conditions may be applied instead of or in addition to laser sensors.

A driving plan, or a route plan, may define a route to be driven by the vehicle 10 and may be used as an input for automatic driving control of the vehicle. The plan may be generated offline and off-site, for example in an office, or on-board the vehicle e.g. by a teaching drive. The plan may define a start point, an end point, and a set of route points for the automatic drive. Such plan may be sent via a wired or wireless connection to, or otherwise loaded to the vehicle, to a memory of the vehicle for access by the control unit 20 or another unit of the vehicle controlling navigation of the vehicle along the route. In another embodiment, route points are not pre-defined, but the mine vehicle defines path and steering control to avoid obstacles during autonomous driving towards a destination point.

In some embodiments positioning of the vehicle 10 is performed by dead-reckoning based positioning. The control unit 20 (or another control unit of the vehicle) may perform a dead reckoning algorithm configured to accumulate the vehicle's travelled distance and heading on the basis of input signal(s) indicative of vehicle wheel rotation and relative heading. Dead-reckoning (DR) refers generally to a method in which position of the vehicle 10 is estimated based on the orientation of the vehicle, for example, calculated from integration of the angular velocity measured by a gyro, and the moving distance, for example, integration of the vehicle speed calculated from the number of pulses of a tire pulse sensor and the tire diameter. It is to be appreciated that the system may comprise further operational modules supplementing DR based position tracking, such as a tyre slipping and/or wear compensation module.

Since error is accumulated by DR, the DR based position or positioning may be corrected by another positioning source. While in the surface section 2, satellite 50 visibility enables to correct positioning of the vehicle 10 based on position obtained by the GNSS device 30. While in the underground section 3, environment based scanning may be used to correct the DR based positioning, such as the positioning based on the scanner 40 and the mapping of scanned tunnel profile data from 2D or 3D scanner and the environment model.

At many worksites comprising underground and surface sections, a fleet of vehicles needs to drive between these sections at challenging conditions, e.g. haul ore to a surface unloading position, such as a crusher or a stock pile in paddock area. Transition (or portal) area between underground and surface sections is often at a fairly steep slope, and stopping especially of a loaded vehicle is to be avoided. However, transitioning between underground and open air positioning is challenging. One problem is that transition to GNSS based positioning us slow, in a worst case scenario even over 60 seconds. While the vehicle is in the underground section, satellite data may get outdated, and re-obtaining satellite data upon again transitioning to the surface section 2 the may be very slow. Even if the satellite data would be up-to-date, satellite signal re-acquisition is fairly slow, and may take up to 15 seconds. It is very important to have reliable position information at all points of (underground-surface) transition areas to avoid collisions and stopping of the vehicle.

There are now provided further improvements related to positioning and vehicle control at blind spots, as further illustrated below.

Figure 2:
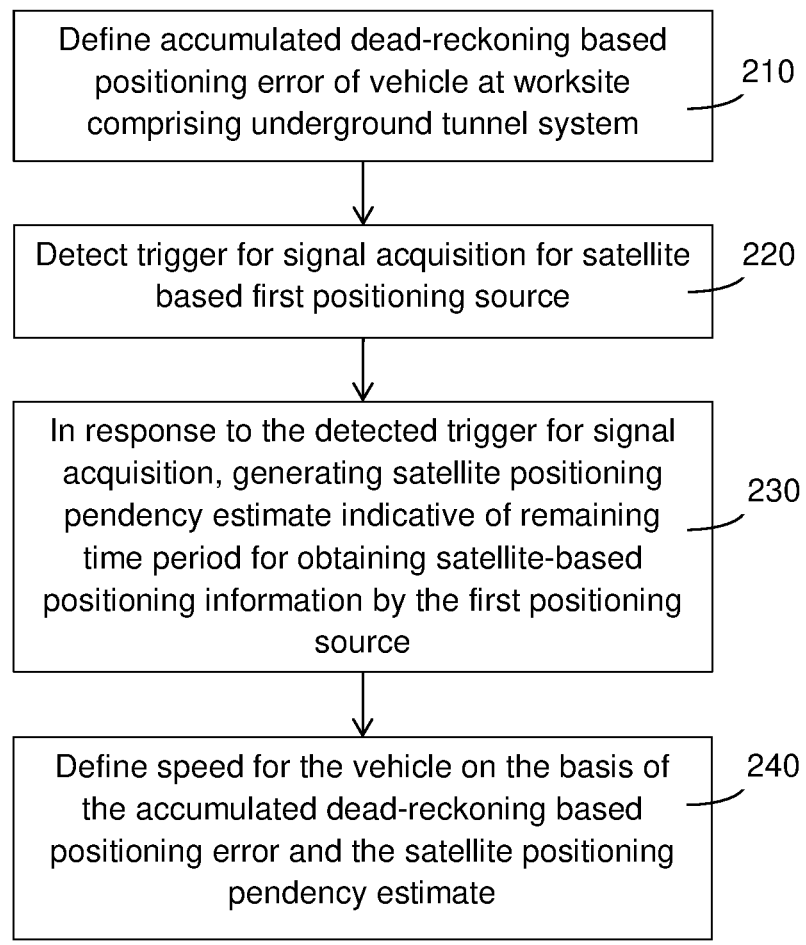
FIG. 2 illustrates a method according to at least some embodiments.

FIG. 2 illustrates a method for controlling positioning according to some embodiments. The method may be performed by a vehicle and a controlling apparatus thereof, such as the vehicle 10, and by the control unit 20 thereof.

The method may comprise defining 210 accumulated DR based positioning error of a vehicle at a worksite comprising an underground tunnel system. Block 220 comprises detecting a trigger for signal acquisition for satellite based first positioning source. In response to the detected trigger for signal acquisition, a satellite positioning pendency estimate is generated 230. The pendency estimate is indicative of estimated remaining time period for obtaining satellite-based positioning information by the first positioning source. Speed is defined 240 for the vehicle on the basis of the accumulated DR based positioning error and the satellite positioning pendency estimate.

A speed adjustment algorithm may be executed in block 240. The speed may be adjusted in block 240 to reduce the speed of the vehicle to avoid stopping of the vehicle before obtaining the satellite positioning information. For example, the control unit 20 may reduce speed of the vehicle to a value selected in the range of 2 to 15 km/h. The control unit 20 may set a speed limit for the vehicle. Block 240 may comprise further inputs and control operations based on further criterion and/or threshold values. In an embodiment, accumulated DR based positioning error is continuously monitored and applied as an input, and the speed is adjusted to avoid the accumulated DR based positioning error to exceed a stopping (or maximum admitted error) threshold value during the remaining time period for obtaining the satellite positioning information. The speed definition may thus be based on the amount of accumulated DR based positioning error (on which the defined speed may be dependent on). However, it is to be appreciated that various other dynamically changing and also preconfigured input parameters may be applied in block 230 and 240, some examples being illustrated below.

After block 240, there may be a further block of controlling a driveline component of the vehicle 10 in accordance with the defined speed. The speed may be gradually, e.g. linearly, reduced to the defined (target) speed.

Obtaining the satellite positioning information of block 230 may refer to obtaining adequately reliable position estimate (e.g. exceeding a minimum quality reference level or position estimate error (estimate) less than a threshold value) by the satellite-based positioning source. The satellite positioning pendency estimate may be indicative of the remaining time explicitly or implicitly. For example, the estimate does not have to directly specify the remaining time period, but may specify a value dependent on the time period, e.g. by specifying remaining distance (for given speed of the vehicle). Further, the estimate may be indicative of the time for obtaining satellite positioning information indirectly, e.g. by indicating estimated time for obtaining GNSS signal. Thus, since there is a direct dependency between the estimated time period for obtaining GNSS signal and final time period for obtaining the position information (differing by fairly constant time period for processing the signal), the estimate may well be applied (for defining the speed) as indicating the time for obtaining the signal. Detecting the trigger for the signal acquisition may refer generally to detecting need for attempting to obtain satellite based positioning and connectivity. It is to be noted that availability of the satellite based positioning may (also) be continuously monitored, and the signal acquisition may refer to signal re-acquisition.

The vehicle 10 may thus be automatically controlled with optimal driving speed through underground to surface transition area, while enabling to continuously navigate the vehicle based on appropriately accurate position. Interruptions and stopping of an autonomously operating vehicle may thus be minimized or avoided, improving production efficiency and affecting other vehicles at the same route. Manual operator interventions may thus also be reduced. Furthermore, additional infrastructure, such as GNSS signal repeaters at the transition areas may be avoided or minimized.

The control unit 20 may perform further block(s) of checking if accumulated DR based positioning error has reached the stopping threshold. If so, the vehicle 10 is stopped. In some embodiments, remaining (DR based travelling) distance, indicative of how long the vehicle is able to travel without stopping in case no position correction is available, is defined on the basis of the accumulated error and the stopping threshold. The speed may be defined in block 240 on the basis of the estimated distance.

After controlling the speed, block 230 may be returned (or further block entered) to update the satellite information pendency estimate and further accumulate the DR based positioning error. The speed for the vehicle may then be redefined on the basis of the further accumulated DR based positioning error and the updated pendency estimate. The control unit 20 may perform further block(s) of checking if accumulated DR based positioning error will reach the stopping threshold with the current speed and the currently remaining time for obtaining the satellite-based positioning estimate. If so, the control unit may perform redefinition and further reduction of the speed to avoid the stopping.

A set of speed limitation events may thus be performed based on updated pendency estimates and further accumulated position error values. Speed of the vehicle may be gradually reduced during the remaining time period for obtaining the satellite positioning information to a target speed to avoid stopping of the vehicle before obtaining the satellite positioning information.

DR based positioning may be corrected by updating position of the vehicle 10 in the underground tunnel system based on position information from a second positioning source, configured to position the vehicle based on tunnel scanning, before reliable position estimate is available from the first positioning source. This may be an additional step after and/or before block 210 and may be entered in response to a position correction threshold being met, such as pre-configured distance being travelled or time being elapsed since previous correction, or the accumulated DR positioning error reaching a trigger value for position correction. Check for the trigger of block 220 may be a further step in such procedure. In some embodiments, the accumulated DR based positioning error is defined in block 210 after previous position correction based on the second positioning source. The definition of the accumulated DR based positioning error may be restart or reset in response to updating the position of the vehicle based on the position information from the second positioning source and block 210 again entered.

Detecting the trigger in block 220 may comprise detecting unavailability or loss of satellite-based positioning option or unavailability or loss of environment scanning based positioning. In a further example option, block 220 comprises detecting (initial or first) satellite signal, in response to which satellite positioning estimate acquisition procedure may be initiated in accordance with the applied GNSS technique and receiver. For example, detecting the trigger comprises at least one of:

detecting the vehicle 10 to be positioned at an underground-surface transition area, which may be predefined e.g. in the environment model and/or route information, detecting a signal for satellite-based positioning being lost or degrading to a satellite signal acquisition trigger threshold value, or detecting loss of environment scanning based positioning or reliability of the environment scanning based positioning degrading to an associated trigger threshold value.

However, other triggers may be alternatively or additionally applied. Depending on the detected trigger, associated procedure and input(s) are applied to generate 230 the satellite positioning pendency estimate.

After satellite signal is acquired after block 240, a position estimate is received from the first positioning source. In response to receiving (reliable) satellite-based position estimate, DR based position of the vehicle may be updated, and normal or default driving mode speed may be controlled. Such normal or default driving mode speed may be e.g. speed applied before entering a (satellite positioning pending) mode in which speed of the vehicle was limited in or after block 240 based on the pendency estimate, speed defined for an autonomous driving mode of the vehicle, or speed defined for current position of the vehicle in a route or driving plan or area applied for the vehicle.

Figure 3:
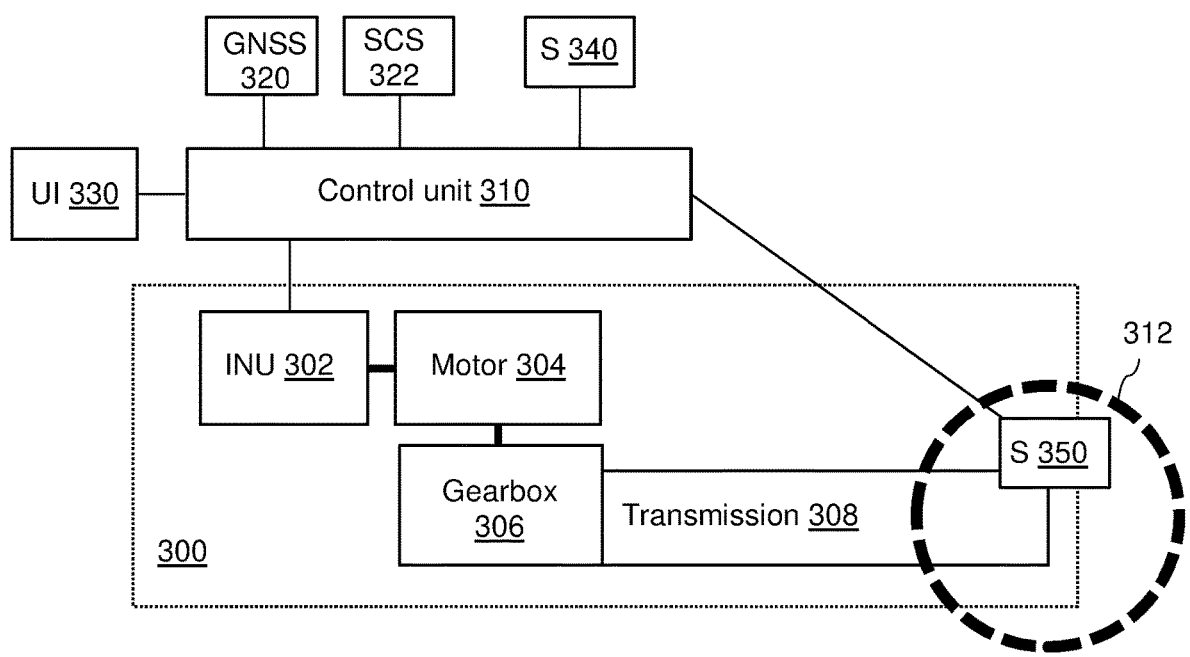
FIG. 3 illustrates control architecture for controlling positioning according to some embodiments.

FIG. 3 illustrates an arrangement and elements of a vehicle, such as the vehicle 10, for controlling the vehicle in an autonomous driving mode based on the method of FIG. 2 and at least some embodiments thereof.

In this example, driveline 300 of the vehicle comprises an electric motor 304 driven by an inverter unit (INU) 302. The INU 302 comprises an inverter, which at least in some instances may also be referred to as frequency converter, alternative current (AC) drive, variable speed drive (VSD), or variable frequency drives (VFD), controlling the voltage and frequency of power supplied to an AC motor to control the torque and rotation speed of the motor 304.

Wheels 312, such as front wheels and rear wheels of the vehicle 10 are rotated by a transmission mechanism 308. The transmission mechanism 308 is rotated by a gear box (or drop) assembly 306. The gear box is driven by the electric motor 304. The INU 302 is powered by electric energy from an electrical supply of the vehicle (not shown).

A control system or unit 310, such as the control unit 20, may be configured to perform the method of FIG. 2 and further control the driveline 300 on the basis of the defined speed. The control unit 310 may comprise one or more computing units/processors executing computer program code stored in memory. The control unit may be connected to one or more other control units of a control system of the vehicle, in some embodiments by a controller area network (CAN) bus. The control unit 310 may obtain driveline information (e.g. provided to the bus by the INU 302) from the bus system.

The control unit 310 may be connected to a GNSS source 320, such as a GPS receiver device providing GPS position estimates, and a scanning (based) positioning source SCS 322, such as a module or unit generating a position estimate based on processing operational scanned tunnel profile data from scanner(s) and reference profile data stored in an environment model. The control unit 310 may receive position estimates and associated quality or reliability information from the GNSS source 320 and the SCS 322. Further, the control unit 310 may be configured to detect 220 the trigger based on information received from the GNSS source 320 and/or the SCS 322, or another entity in the vehicle.

The control unit 310 may use information from the GNSS source 320 as an input in block 230 to generate the pendency estimate, some examples being illustrated below, without limitation to the example of FIG. 3. This may involve using dynamically changing and/or preconfigured parameter information as input. In an example embodiment, satellite signal availability or quality information is applied in block 230 (and/or 220).

Information pre-configured in or by the control unit may be applied in block 230, e.g. GNSS device and/or other satellite positioning specific parameter information affecting the time period for obtaining reliable satellite-based positioning estimate from the GNSS. For example, the control unit 310 may apply preconfigured time period (to obtain reliable satellite-based position estimate, e.g. 15 seconds) as basis for defining 240 the speed upon receiving an associated initial signal from the GNSS 320. Location-specific and/or temporal history data may be stored by the control unit 310, indicative of parameters affecting and applicable of inputs to block 230 and/or 240. For example, information of current satellite positions and/or satellite movement after previous positioning at the transitioning area may be applied as input. In a further example embodiment, position or transition area specific information is stored and applied in block 230 and/or 240.

The pendency estimate may be generated on the basis of or defined by time to fix information, e.g. time to first fix (TTFF) value, which may be defined based on location-specifically. For example, environment or route map or model is divided into (location) grids of appropriate size and the time to fix information is defined grid specifically. Time to fix information associated with the current grid the vehicle is positioned in may be retrieved and applied in block 230. Validity of a satellite almanac may affect the pendency estimate generation and be an input in block 230. That is, if the almanac is not available or has expired, the GNSS 320 needs to conduct widest search to acquire a satellite signal. Thus, around 100 seconds may be required. If the almanac is still valid, the receiver may substantially reduce the scope of search for satellite signal search, and e.g. perform the search within 25 seconds.

In GPS embodiments, the GNSS positioning source 320 comprises a GPS (receiver) device which detects the position (the GPS position) of the vehicle 10 by detecting the position (the GPS position) of an antenna of the GPS device. The GPS device may detect a Fix solution, a Float solution, or a Single solution indicating the accuracy of the detected GPS position, based on the number of the positioning satellites from which the antenna has received information, for example, in the process of detecting the position of the antenna. The GPS receiver may output a signal indicating No solution when the GPS position cannot be measured.

In an embodiment, GPS quality/state information received from the GPS device and/or stored in connection with previous GPS positioning event is processed and applied in block 230 to generate the pendency estimate and/or in block 240 for defining the speed. For example, received GPS quality information is processed to estimate remaining time to achieve Fix state/solution. The speed may then be adjusted on the basis of the estimate time, to avoid the DR based accumulated error to exceed a maximum admitted error threshold value and thus stopping the vehicle. Location-specific statistics information, which may be indicative of GPS state transition time, may be stored by the control unit 310. For example, information may be maintained how long it has taken to transition to Fix state (e.g. at associated grid). The state transition may involve one or more state transitions (No solution→Single→Float→Fix). This may be of particular advantage if the work site includes areas with different shadow areas. Satellite orbital periods may be taken into account by maintaining history information for block 230 time-specifically. For example, day is divided into e.g. half an hour blocks and (Fix) state transition information may be stored for each block. This is particularly advantageous when there is substantial temporal variation in the visibility of satellites at the site.

The quality information from the GPS device may comprise real-time kinematic correction information and/or error variance information (which may be in an error ellipse). Error ellipse is related to the positioning confidence level or integrity by horizontal position error (HPE) cumulative distribution function.

The control unit 310 may be connected to sensors or sensor systems 340 and 350 providing inputs for the control unit 310. Examples of such sensors include hydraulic pressure sensor, a gyroscope, and a wheel rotation sensor.

The INU 302 is controlled by the control unit 310 on the basis of parameter(s) defined by the control unit to control the motor 304 of the vehicle. The control unit 310 may be configured to transmit control signals at least in accordance with the defined speed to the INU 302 to control the driveline rotational speed and/or torque.

The control unit 310 may in some embodiments be directly or indirectly connected also to further elements of the driveline, such as the motor 304 or a further controller thereof, or a sensor in the driveline. For example, the RPM (revolutions per minute) of the front wheel(s) can be measured by RPM sensor(s). The control unit 310 may obtain the RPM information from the driveline and process it by an algorithm to detect slippage or spin of the wheels (in case there is a differential lock).

The control unit 310 may be configured to define DR based position estimate based on information received from sensors 340, 350. The control unit 310 may comprise a DR algorithm configured to accumulate the vehicle's travelled distance and heading on the basis of input signals indicative of vehicle wheel rotation and relative heading. The control unit 310 may be configured to define and/or accumulate 210 the DR positioning error. Alternatively, a DR-position source provides DR positioning estimate and may also accumulate the error and indicate it to the control unit 310. The control unit 310 may be configured to control DR-position correction based on the position information received from the GNSS 320 and/or the SCS 322, in some embodiments based on the DR positioning error reaching a correction threshold, a preconfigured time interval, or travelled distance threshold since the previous correction being reached.

The control unit 310, or another module in the vehicle 10, may be configured to host a positioning service or provider. The positioning service may provide current position of the vehicle 10 to one or more position consumers (not shown). A navigation/travel controller or automatic driving controller of the vehicle may be the position information consumer, and apply the position information to generate steering commands for guiding the vehicle to a subsequent route point of a route plan. The vehicle may also comprise or be connected to other module(s), which may utilize the position information, such as a specific collision avoidance control module, a task manager (may be configured to assign work tasks for a fleet of vehicles and update and/or monitor task performance and status), a visualizer module (to generate at least some display views for an operator (locally and/or remotely), a remote monitoring and control module, etc.

A user interface (UI) 330 may be connected to the control unit 310, comprising e.g. a joystick, a touch screen, or other input means by which an input signal from a user may be provided to the control unit for affecting e.g. the autonomous driving of the vehicle and to configure at least some of the presently disclosed control features. The control unit 310 may be connected to further units in the vehicle, such as an actuator control unit or (sub)system, which may be connected to a boom actuator and bucket actuator.

The vehicle 10 of FIG. 1 and the system of FIG. 3 are disclosed herein only as examples where the embodiments disclosed herein may be implemented. The embodiments are applicable to various other types and configurations of vehicles and control units.

Figure 5:
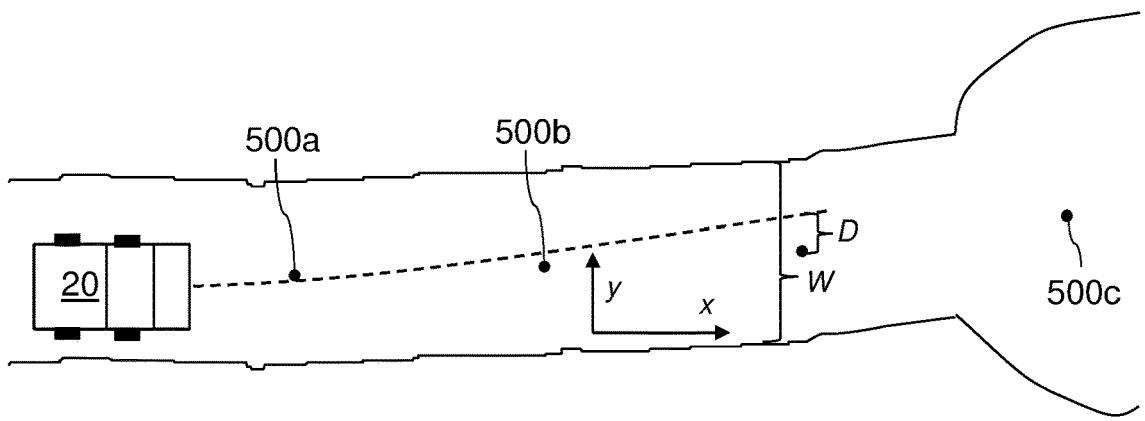
FIG. 5 illustrates a top view example of a vehicle and a worksite portion.

FIG. 5 illustrates a top-view example of the vehicle 10 driving along a route defined by a set of route points 500a, 500b, 500c. The broken line illustrates an example path and deviation from the route points caused by DR positioning error.

In some embodiments, while the vehicle 10 is moving, the control unit 20, 310 accumulates in block 210 latitudinal (DR) error (in direction y) and longitudinal (DR) error (direction x in the direction of driving) after reset at the previous position correction.

In an embodiment, the longitudinal and/or latitudinal error is estimated on the basis of recent historical error correction to DR based positioning by the first and/or second positioning source, e.g. such historical error correction data recorded for a predetermined time or distance. Thus, error estimation and/or threshold setting may be adapted based on amount of correction required at one or more earlier correction events, i.e. difference(s) between earlier dead-reckoning based position and associated position by the first or second positioning source.

For example, the longitudinal error may be estimated based on preceding detected need for longitudinal error correction required for a given longitudinal distance. For example, the latitudinal error may be estimated on the basis of earlier required heading correction based on the scanning-based positioning for a predetermined distance or time. The latitudinal error may be corrected on the basis of change of corrected heading and heading obtained from a gyroscope of the vehicle 10. Such estimates may be filtered so that a trend is achieved, to avoid instant deviations affecting too much.

The accumulated latitudinal and/or longitudinal error(s) are compared to maximum allowed error threshold value(s), which may also be referred to or associated with safety margin for the vehicle. In response to a maximum allowed error threshold value(s) being exceeded, the vehicle 10 may be stopped or speed further reduced. When position is corrected (by scanning-based or satellite-based position) these error counters are reset. Monitoring of the latitudinal error is particularly relevant in underground tunnels. For example, when the accumulated latitudinal error exceeds safety margin D, the vehicle is stopped. In an embodiment, an error ellipse is determined on the basis of accumulated latitudinal error and longitudinal error. In response to detecting the error ellipse to reach known tunnel width (which may be an estimate based on the environment model), the vehicle may be stopped.

In some embodiments, sliding window(s) are maintained for the accumulated dead-reckoning based positioning estimate. The sliding window may be applied for defining the speed for the vehicle 10 in block 240. The sliding window may be reset when the DR-based position is corrected.

The error threshold(s) applied may be configurable. In some embodiments, the error threshold(s) are automatically configured based on the environment traversed by the vehicle and/or properties of the vehicle. The error threshold (s) may be configured on the basis of the environment model, route model, and/or path traversed by the vehicle. In an example, width of the tunnel W is estimated on the basis of the environment model and the error threshold ET may define maximum allowed estimated vehicle distance from a wall and may be defined:

$$ET = W - (D + VW \text{ (vehicle width)})$$

In some embodiments, time elapsed and/or distance travelled by the vehicle since the previous position correction is monitored. The vehicle is controlled to stop in response to detecting that a maximum time or maximum distance is reached (and if the position cannot be corrected). In an embodiment, the allowed driving distance and/or time is affected by the environment model, route model, and/or path traversed by the vehicle. For example, if there is a curve on the route, the allowed driving distance and/or time is reduced/smaller. Thus, impact of path or route profile to the DR accuracy may be taken into account.

Figure 4:
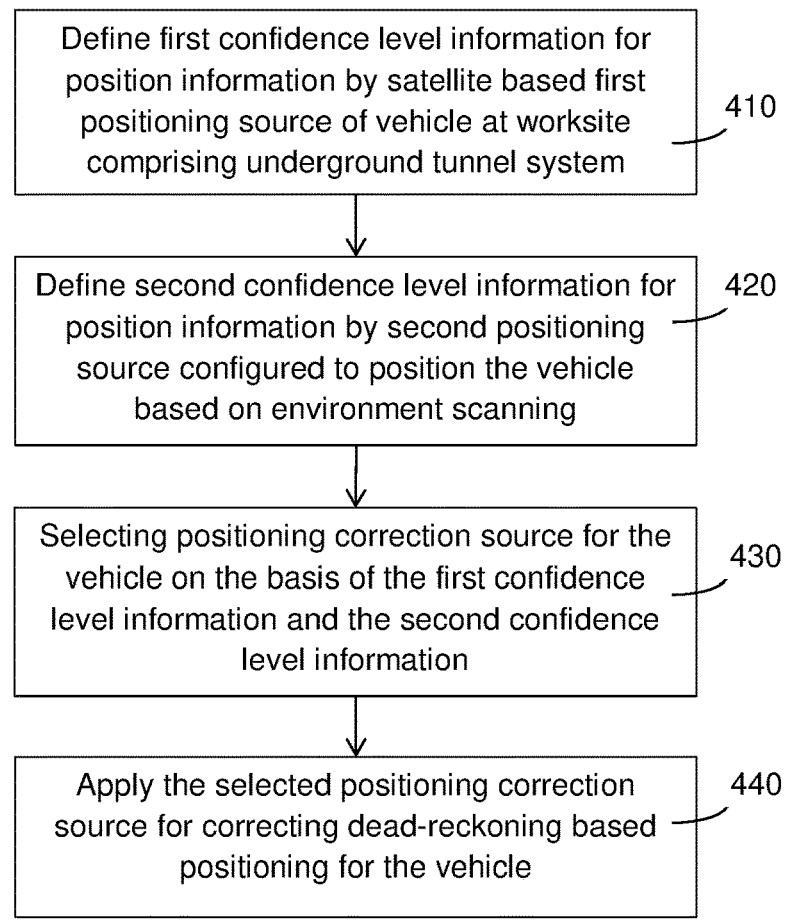
FIG. 4 illustrates a method according to an embodiment.

In some embodiments, position correction method and source may be selectively applied on the basis of quality of available positioning sources and position information thereof. With reference to example of FIG. 4, the control unit 20, 310 may be further configured to perform at least some of:

defining 410 first confidence level for position information by the satellite based first positioning source of the vehicle, defining 420 second confidence level for position information based on environment scanning, selecting 430 a positioning correction source for the vehicle on the basis of the first confidence level and the second confidence level, and applying 440 the selected positioning information source for correcting dead-reckoning based positioning for the vehicle.

Such confidence level (information) may be defined based on processing position estimate information and/or quality information from the respective positioning source. In some example embodiments, confidence level for GPS may be defined by processing the error estimate on the basis of a target positioning accuracy parameter, and the second confidence level may be defined on the basis of level of correlation between the scanned tunnel profile data and the reference profile data. The first confidence level and/or the second confidence level may be applied in one or more of blocks 220 to 240. For example, the trigger is detected in response to the first and/or second confidence level meeting a respective trigger threshold value.

In some embodiments, speed reduction for the vehicle 10 is controlled in response to the second positioning source indicating weak or weakening confidence, e.g. the second confidence values meeting a preconfigured slowdown threshold value. The speed of the vehicle may be reduced gradually to the associated value or range.

It is to be appreciated that various further features may be complement or differentiate at least some of the above-illustrated embodiments. For example, there may be further user interaction and/or automation functionality further facilitating the operator to monitor the vehicle, select appropriate action to overcome an issue regarding lacking accurate position information, and control the vehicle.

In an embodiment, position of the vehicle 10 in the transition area may be updated on the basis of an external location reference unit, if available. The location reference unit may be a wireless signal emission unit at a tunnel wall or a location tracking unit of another vehicle, for example. An RF tag, an access point, a visually readable code or another fixed unit the location of which is accurately known may serve as the location reference. Reference is also made to U.S. Pat. No. 7,899,599 disclosing that such identifier may be applied to update DR based location.

An electronic device comprising electronic circuitries may be an apparatus for realizing at least some embodiments illustrated above, such as the method illustrated in connection with FIG. 2 and features illustrated for the control unit 20. The apparatus may be comprised in at least one computing device connected to or integrated into a control system of the vehicle. Such control system may be an intelligent on-board control system controlling operation of various sub-systems of the vehicle, such as a hydraulic system, a motor, etc. Such control systems are often distributed and include many independent modules connected by a bus system of controller area network (CAN) nodes, for example.

Figure 6:
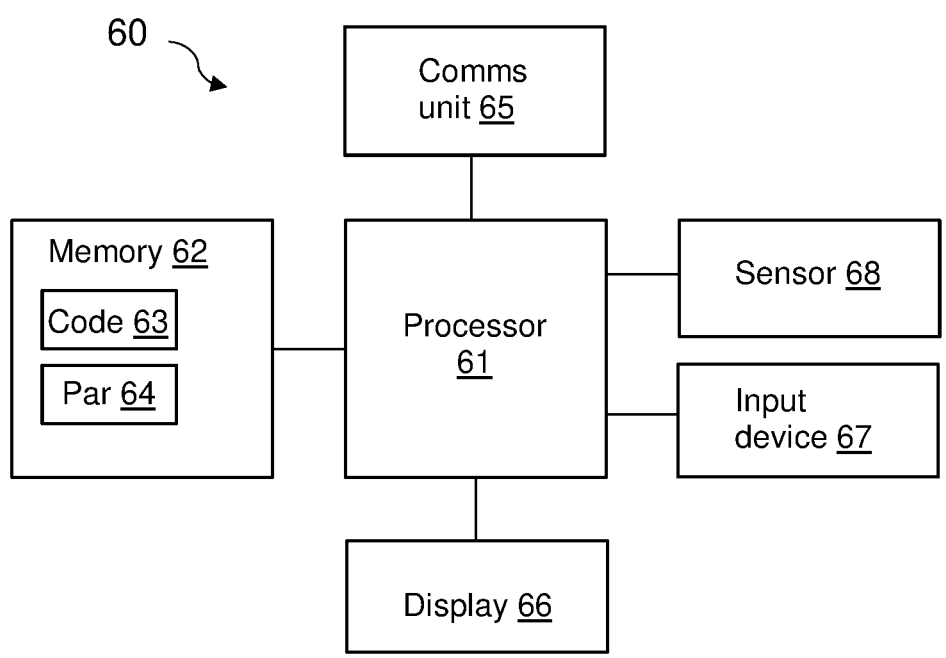
FIG. 6 illustrates an example apparatus capable of supporting at least some embodiments.

FIG. 6 illustrates a simplified example apparatus capable of supporting at least some embodiments of the present invention. Illustrated is a device 60, which may be configured to carry out at least some of the above-illustrated embodiments relating to speed control based on generating the satellite positioning pendency estimate. In some embodiments, the device 60 comprises or implements the control unit 20, or other module(s), functions and/or unit(s) for performing at least some of the above-illustrated embodiments.

Comprised in the device 60 is a processor 61, which may comprise, for example, a single- or multi-core processor. The processor 61 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 60 may comprise memory 62. The memory may comprise random-access memory and/or permanent memory. The memory may be at least in part accessible to the processor 61. The memory may be at least in part comprised in the processor 61. The memory may be at least in part external to the device 60 but accessible to the device. The memory 62 may be means for storing information, such as parameters 64 affecting operations of the device. The parameter information in particular may comprise parameter information affecting the speed control related features, such as threshold values.

The memory 62 may be a non-transitory computer readable medium comprising computer program code 63 including computer instructions that the processor 61 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 60 may comprise a communications unit 65 comprising a transmitter and/or a receiver. The transmitter and the receiver may be configured to transmit and receive, respectively, i.a. data and control commands within or outside the vehicle. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, a non-terrestrial communication standard, and/or Ethernet standards, for example. The device 60 may comprise a near-field communication, NFC, transceiver. The NFC transceiver may support at least one NFC technology, such as NFC, Bluetooth, or similar technologies.

The device 60 may comprise or be connected to a UI. The UI may comprise at least one of a display 66, a speaker, an input device 67 such as a keyboard, a joystick, a touch-screen, and/or a microphone. The UI may be configured to display views on the basis of above illustrated embodiments. A user may operate the device and control at least some of above illustrated features. In some embodiments, the user may control the vehicle 10 via the UI, for example to manually drive the vehicle, operate a boom, change driving mode, change display views, modify parameters 64, etc.

The device 60 may further comprise and/or be connected to further units, devices and systems, such as one or more sensor devices 68, such as the scanner(s) 40 or other sensor devices sensing environment of the device 60 or properties of the vehicle, such wheel rotation or orientation changes.

The processor 61, the memory 62, the communications unit 65 and the UI may be interconnected by electrical leads internal to the device 60 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, elements, and/or materials may be presented in a common list for convenience. However, these lists should be construed as though each member of the list is individually identified as a separate and unique member. Furthermore, the described features, items, elements, or characteristics may be combined in any suitable manner in one or more embodiments.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processor, at least one memory including computer program code, the at least one memory and the computer program code being configured to, with the at least one processor, cause the apparatus at least to:
   define an accumulated dead-reckoning based positioning error of a vehicle at a worksite including an underground tunnel system;
   detect a trigger for signal acquisition for a satellite based first positioning source;
   in response to the detected trigger for signal acquisition, generate, on the basis of location-specific time to fix information, a satellite positioning pendency estimate indicative of a remaining time period for obtaining satellite-based positioning information by the first positioning source;
   define a speed for the vehicle on a basis of the accumulated dead-reckoning based positioning error and the satellite positioning pendency estimate; and
   control a driveline component of the vehicle in accordance with the defined speed.

2. The apparatus of claim 1, wherein the at least one memory and the computer program code are configured to, with the at least one processor, cause the apparatus to:
   define the accumulated dead-reckoning based positioning error after previous position correction based on a second positioning source configured to position the vehicle based on tunnel scanning, the tunnel scanning including comparing scanned tunnel profile data to reference profile data stored in an environment model;
   correct dead-reckoning based positioning by updating a position of the vehicle in the underground tunnel system based on position information from the second positioning source; and
   restart or reset defining the accumulated dead-reckoning based positioning error in response to updating the position of the vehicle based on the position information from the second positioning source.

3. The apparatus of claim 1, wherein detecting the trigger includes detecting an unavailability or loss of satellite-based positioning or unavailability or loss of environment scanning based positioning.

4. The apparatus of claim 1, wherein detecting the trigger includes at least one of detecting the vehicle to be positioned at an underground-surface transition area, detecting a signal for satellite-based positioning being lost or degrading to a satellite signal acquisition trigger threshold value, or detecting loss of environment scanning based positioning or reliability of the environment scanning based positioning degrading to a trigger threshold value.

5. The apparatus of claim 1, wherein the at least one memory and the computer program code are further configured to, with the at least one processor, cause the apparatus to:
   after controlling the speed, update the satellite positioning pendency estimate and further accumulating the dead-reckoning based positioning error; and
   redefine the speed for the vehicle on a basis of the further accumulated dead-reckoning based positioning error and the updated pendency estimate.

6. The apparatus of claim 5, wherein the at least one memory and the computer program code are further configured to, with the at least one processor, cause the apparatus to:
   the means are configured to perform a set of speed limitation events based on updated pendency estimates and further accumulated position error values, wherein the speed of the vehicle is gradually reduced during a remaining time period for obtaining the satellite positioning information to a target speed to avoid stopping of the vehicle before obtaining the satellite positioning information.

7. The apparatus of claim 1, wherein the at least one memory and the computer program code are further configured to, with the at least one processor, cause the apparatus to stop the vehicle in response to the accumulated dead-reckoning based positioning error reaching a stopping threshold.

8. The apparatus of claim 7, wherein the at least one memory and the computer program code are further configured to, with the at least one processor, cause the apparatus to:
   estimate a distance, indicative of how long the vehicle is able to travel without stopping in case no position correction is available, on a basis of the accumulated error and the stopping threshold; and
   define the speed on the basis of the estimated distance.

9. The apparatus of claim 1, wherein the at least one memory and the computer program code are further configured to, with the at least one processor, cause the apparatus to receive position information from the first positioning source after acquiring satellite signal, and control normal or default driving mode speed after updating position of the vehicle on a basis of the received position information.

10. The apparatus of claim 1, wherein the at least one memory and the computer program code are further configured to, with the at least one processor, cause the apparatus to generate the satellite positioning pendency estimate on a basis of quality information from a global navigation satellite system unit.

11. The apparatus of claim 1, wherein the apparatus is a loading and/or hauling vehicle or a drilling rig including means for autonomous operation.

12. A method for controlling autonomous vehicle operations, comprising:
   defining an accumulated dead-reckoning based positioning error of a vehicle at a worksite including an underground tunnel system;
   detecting a trigger for signal acquisition for a satellite based first positioning source;
   in response to the detected trigger for signal acquisition, generating, on the basis of location-specific time to fix information, a satellite positioning pendency estimate indicative of a remaining time period for obtaining satellite-based positioning information by the first positioning source;

defining a speed for the vehicle on a basis of the accumulated dead-reckoning based positioning error and the satellite positioning pendency estimate; and controlling a driveline component of the vehicle in accordance with the defined speed.

13. The method of claim 12, wherein the accumulated dead-reckoning based positioning error is defined after previous position correction based on a second positioning source configured to position the vehicle based on tunnel scanning, the tunnel scanning including comparing scanned tunnel profile data to reference profile data stored in an environment model.

14. The method of claim 12, further comprising:

after controlling the speed, updating the satellite positioning pendency estimate and further accumulating the dead-reckoning based positioning error; and redefining the speed for the vehicle on a basis of the further accumulated dead-reckoning based positioning error and the updated pendency estimate.

15. A non-transitory computer-readable medium storing a computer program comprising code for, when executed in a data processing apparatus, causing a method in accordance with claim 12 to be performed.

* * * * *